(12) United States Patent
Dang

(10) Patent No.: US 8,544,806 B1
(45) Date of Patent: Oct. 1, 2013

(54) SYSTEM FOR MOUNTING ITEMS TO A WALL

(71) Applicant: Steve Van Dang, Irvine, CA (US)

(72) Inventor: Steve Van Dang, Irvine, CA (US)

( * ) Notice: Subject to any disclaimer, the term of this patent is extended or adjusted under 35 U.S.C. 154(b) by 0 days.

(21) Appl. No.: 13/729,170

(22) Filed: Dec. 28, 2012

Related U.S. Application Data

(60) Provisional application No. 61/581,518, filed on Dec. 29, 2011.

(51) Int. Cl.
*A47G 1/20* (2006.01)
*F16B 45/00* (2006.01)

(52) U.S. Cl.
USPC ............ 248/301; 248/304; 248/339; 411/485

(58) Field of Classification Search
USPC .................. D8/371; 411/442, 443, 444, 450, 411/451.5, 469, 477, 485, 490; 248/248, 248/301, 304, 339, 546, 909
See application file for complete search history.

(56) References Cited

U.S. PATENT DOCUMENTS

| | | | | |
|---|---|---|---|---|
| 294,385 A * | 3/1884 | Hennenway | .................. | 248/267 |
| 324,310 A * | 8/1885 | Dunn et al. | .................... | 411/485 |
| 2,382,474 A * | 8/1945 | Gambo | ......................... | 411/462 |
| D247,157 S * | 2/1978 | Yensh | ............................. | D8/371 |
| D247,219 S * | 2/1978 | Yensh | ............................. | D8/371 |
| D301,975 S * | 7/1989 | Mullen | .......................... | D8/371 |
| 6,695,276 B2 * | 2/2004 | Skorka | .......................... | 248/497 |
| 8,356,782 B2 * | 1/2013 | Robichaud et al. | ......... | 248/217.1 |
| 2004/0159766 A1 * | 8/2004 | Skorka | ............................ | 248/544 |
| 2006/0228192 A1 * | 10/2006 | Chang | ......................... | 411/451.3 |
| 2007/0252062 A1 * | 11/2007 | Forbes | ......................... | 248/304 |
| 2008/0265123 A1 * | 10/2008 | Repac | ........................... | 248/546 |

\* cited by examiner

*Primary Examiner* — Robert Canfield
(74) *Attorney, Agent, or Firm* — Plager Schack LLP

(57) ABSTRACT

A system for mounting an item to a wall is provided comprising a plurality of stakes, each stake having a proximal end and a distal end and an extension member there between, and each stake comprising a hook at the proximal end and a piercing element at the distal end. At least one stake comprises an extension member having a uniform width, and at least one stake comprises an extension member having a width greater than the width of the hook such that when a plurality of stakes are positioned adjacent each other within the wall, the plurality of hooks functions as a single hanger upon which the item to be hung may be suspended on the wall.

5 Claims, 13 Drawing Sheets

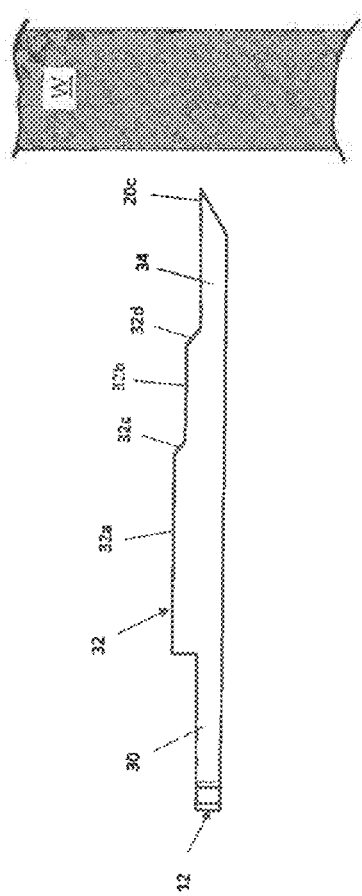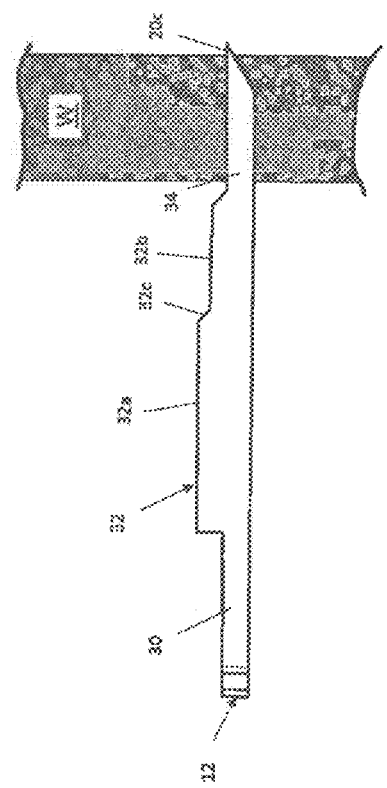

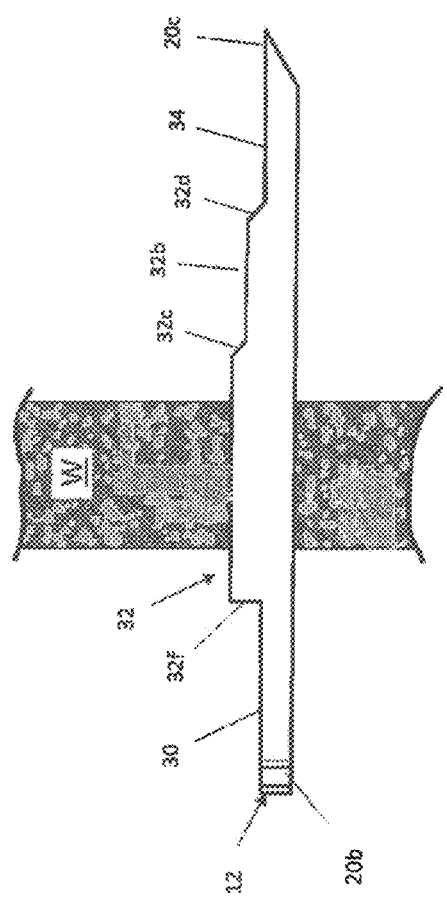
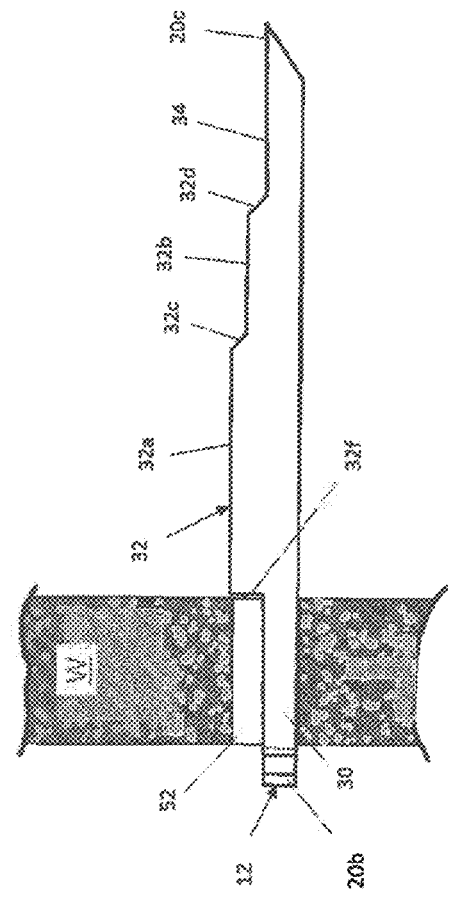

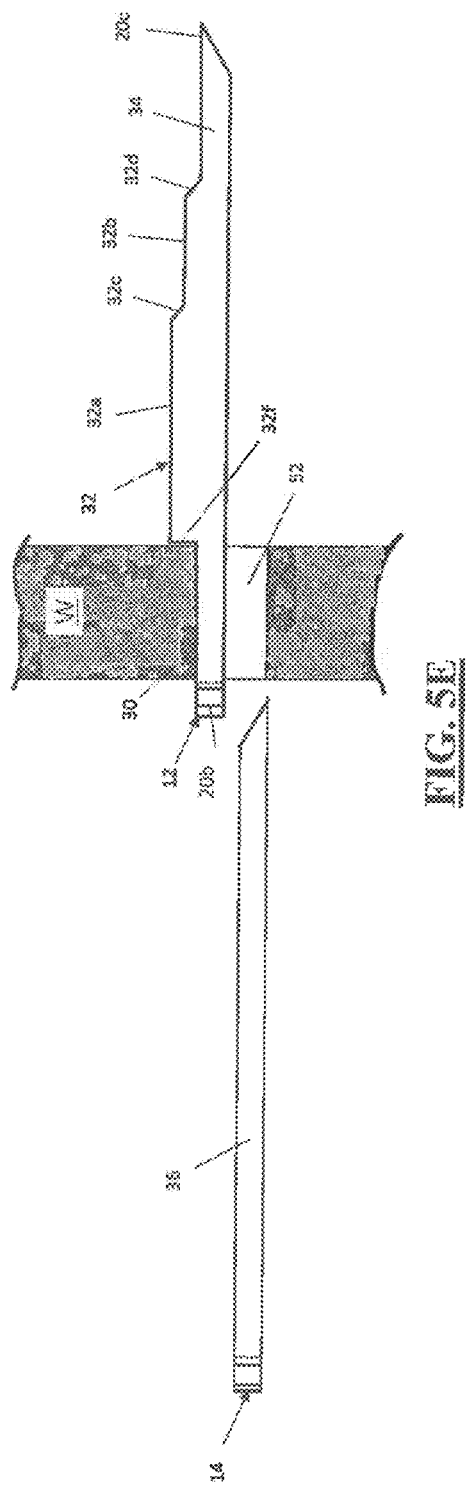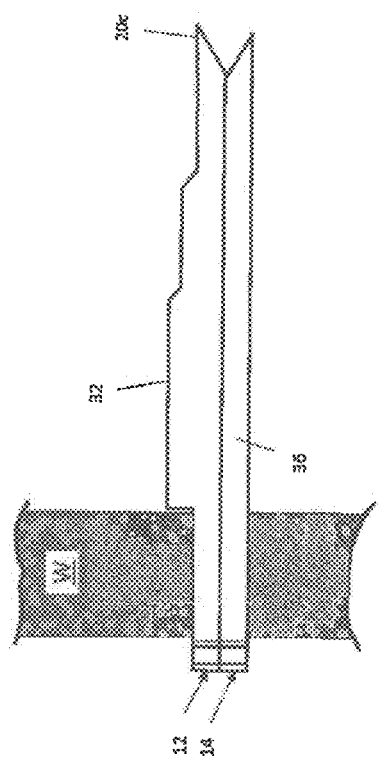
FIG. 5E
FIG. 5F

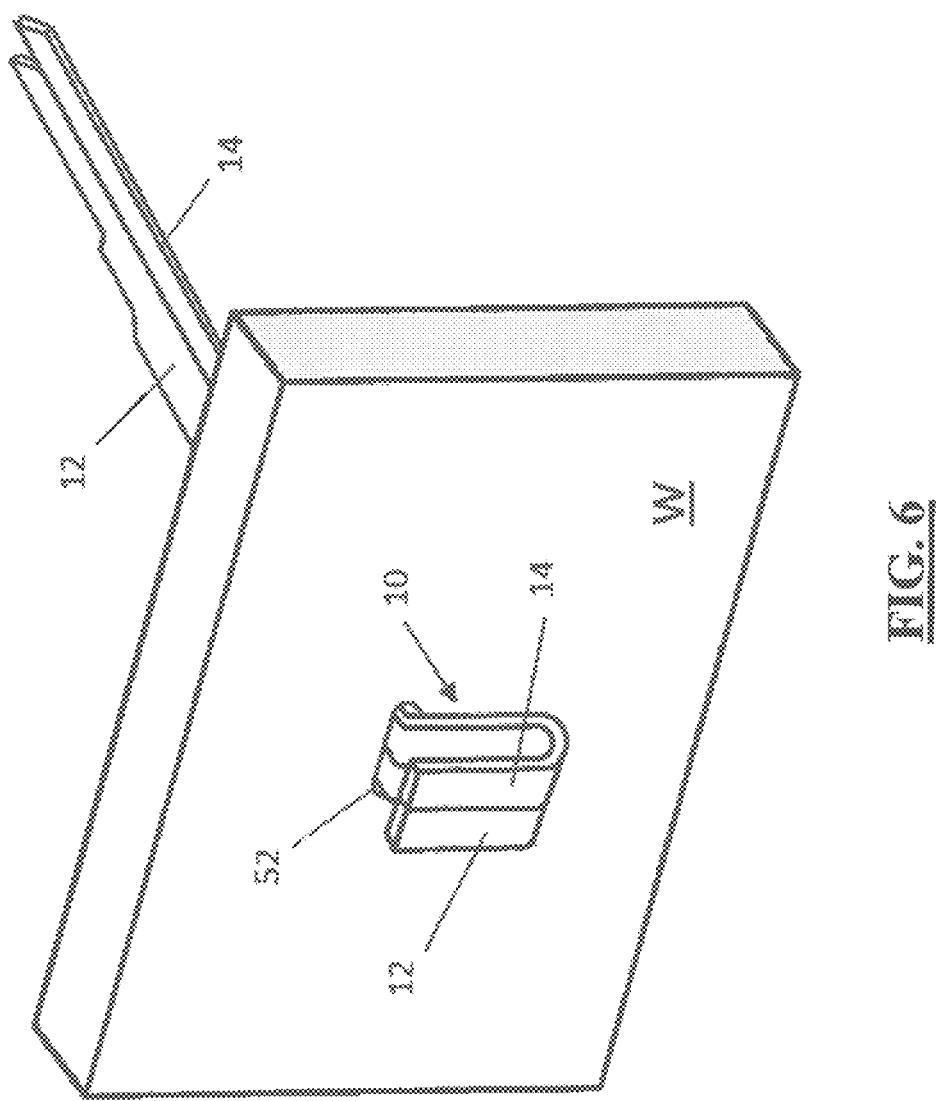

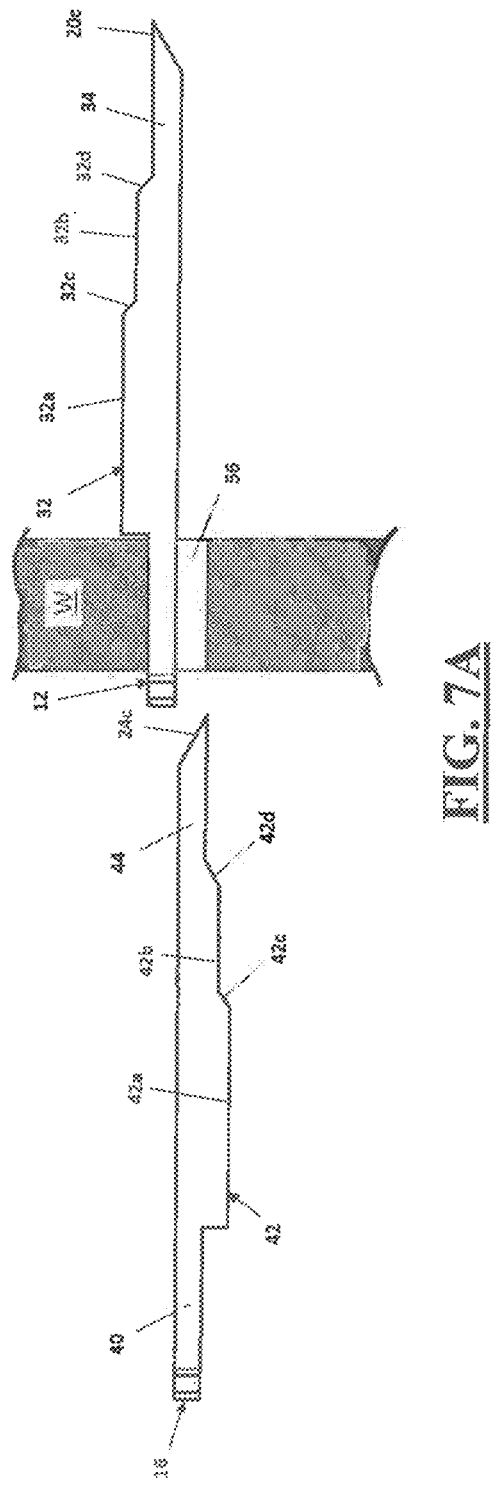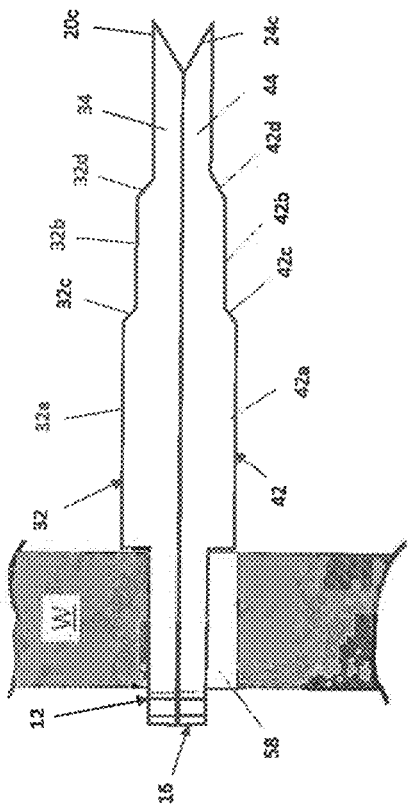
FIG. 7A
FIG. 7B

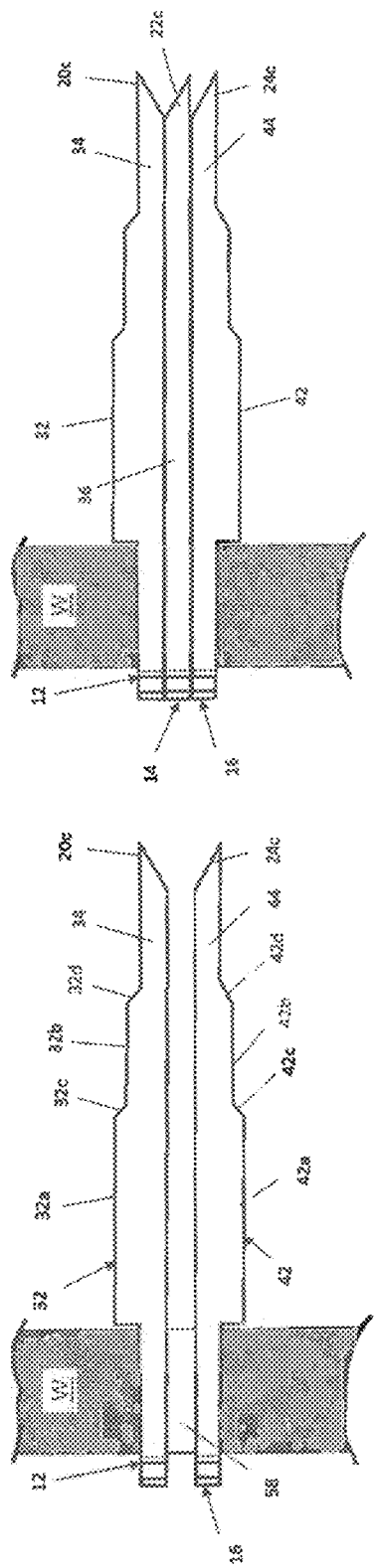
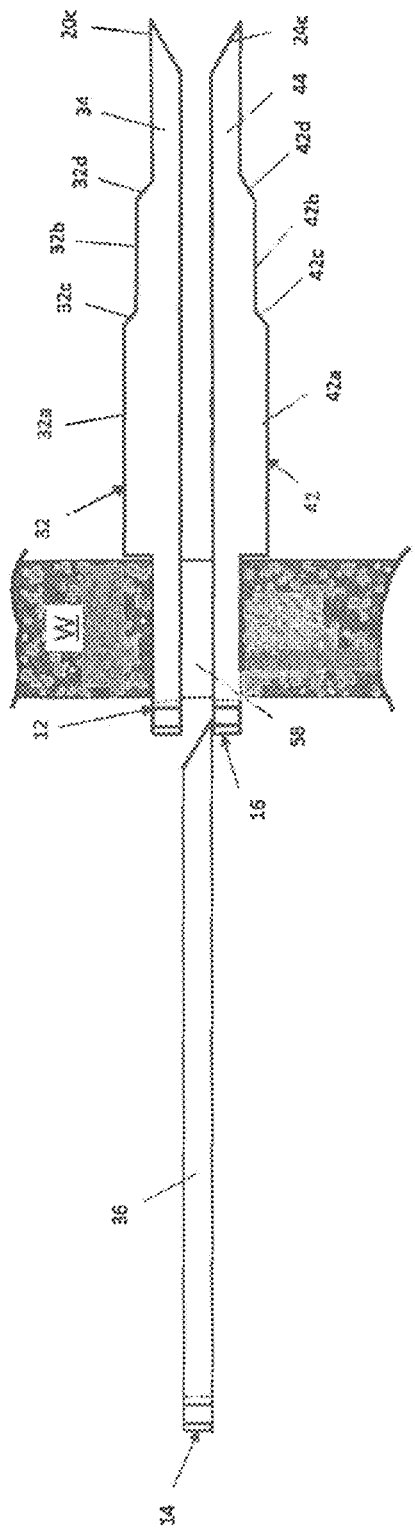
FIG. 7C
FIG. 7D
FIG. 7E

SYSTEM FOR MOUNTING ITEMS TO A WALL

RELATED APPLICATION

This application claims priority to provisional patent application U.S. Ser. No. 61/581,518 filed on Dec. 29, 2011, the entire contents of which is herein incorporated by reference.

BACKGROUND

The embodiments herein relate generally to a system for mounting items to a wall, and in particular a stake system that permits wide variety of configurations to accommodate various weights of the item being hung.

Numerous mechanisms exist for application to a wall for hanging items to the wall, colloquially referred to as picture hangers. Some require tools for insertion. Others require that if you wish to hang initially a light item, and then later replace it with a heavier item, you must then remove the existing picture hanger and replace it with a different one that can accomodate the heavier weight. Still others require a molly, particularly when applying the hanger to a portion of the wall where there is no support stud directly behind the spot chosen for the hanger. Others come out of the wall too easily, or fall out if not applied properly or if used to hang an item to heavy for it. And, depending upon what type of backing hardware is on the back of the picture or item to be hung, a user might need to choose a different wall hanger to accommodate the hardware. Thus, there is a need for a system that is easy to use, does not necessarily need any tools, provides secure hanging of items that come with various backing hardware configurations, and can be easily employed to accomodate heavier items at the same location where a lighter item had previously been hung.

SUMMARY

Embodiments of the present invention advantageously address some or all of the above limitations on existing wall hanging devices. In one embodiment, a system for mounting an item to a wall is provided comprising a plurality of stakes, each stake having a proximal end and a distal end and an extension member therebetween, each stake comprising a hook at the proximal end and a piercing element at the distal end. At least one stake comprises an extension member having a uniform width, and at least one stake comprises an extension member having a width greater than the width of the hook. In one embodiment, each hook is uniform in configuration such that when a plurality of stakes are positioned adjacent each other within the wall, the plurality of hooks functions as a single hanger upon which the item to be hung may be suspended on the wall. In another embodiment, at least one stake comprises an extension member having a plurality of widths is configured asymmetrically toward a first direction normal to the extension member of the stake. At least a second stake comprises an extension member having a plurality of widths is configured asymmetrically toward a second direction normal to the extension member of the stake.

BRIEF DESCRIPTION OF THE FIGURES

The detailed description of some embodiments of the invention will be as described below with reference to the accompanying Figures, wherein like numerals represent corresponding parts of the Figures. The Figures are intended only to reflect examples of how embodiments of the invention may be configured and examples of the arrangement of such embodiments, and the variation in how those arrangements may be employed.

FIGS. 5A through 5F show sequentially how the arrangement of FIG. 4A is applied to a wall;

FIG. 6 shows a perspective schematic view of the result of the installation reflected in FIGS. 5A through 5F;

FIGS. 7A through 7E show sequentially how the arrangement of FIG. 4B is applied to a wall;

DETAILED DESCRIPTION OF CERTAIN EMBODIMENTS

Figure 1:
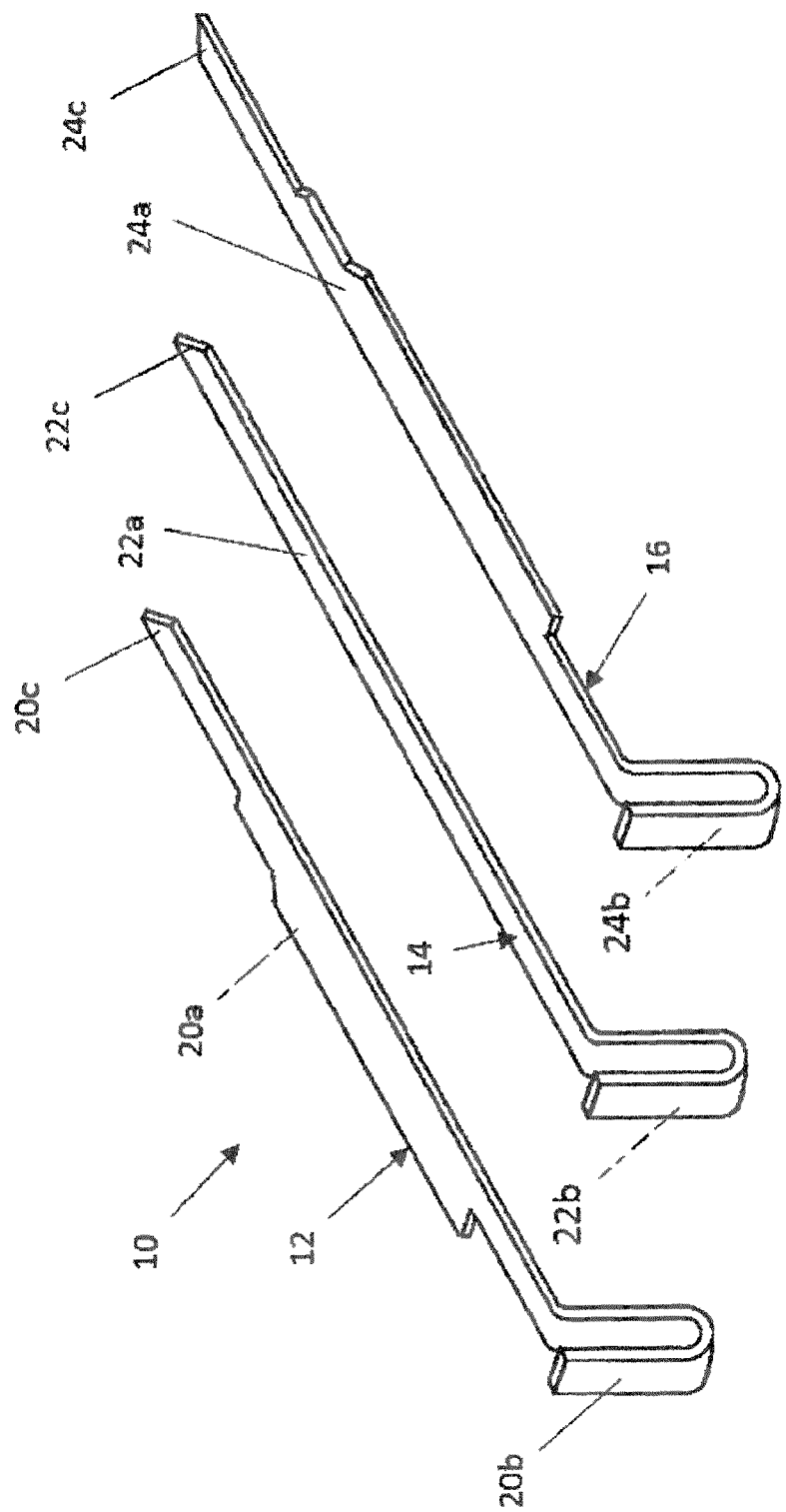
FIG. 1 is a perspective schematic view of one embodiment of the invention showing three anchors comprising a left-sided anchor, a right-sided anchor, and a central anchor.
Figure 2:
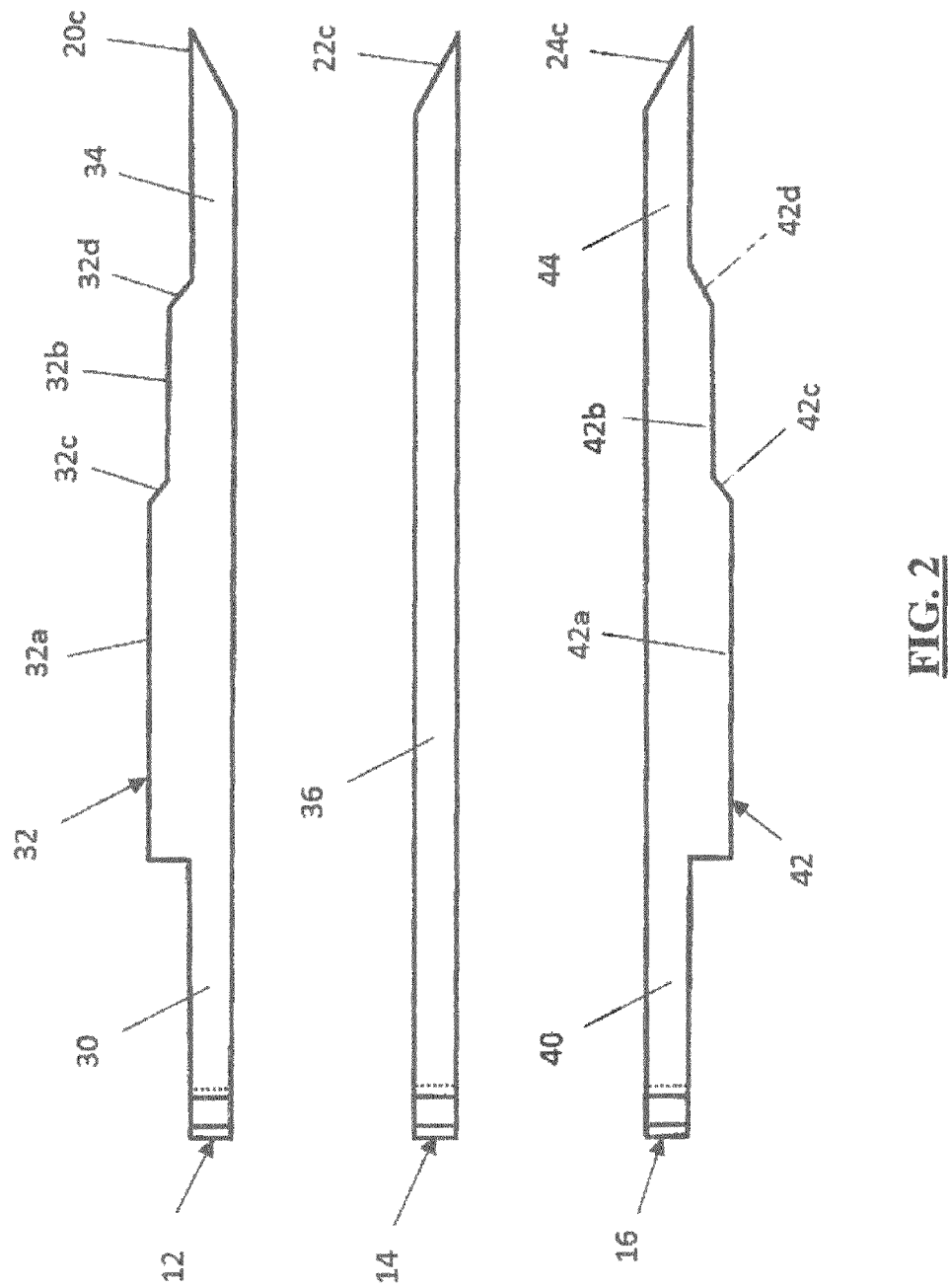
FIG. 2 is a top schematic view of the embodiments of FIG. 1.

By way of example, and referring to FIGS. 1 and 2, a system is provided for hanging items of various weights and with various backing hardware in a simply to use manner that permits easy flexibility to accommodate heavier items as needed. In that regard, one example embodiment 10 comprises a plurality of stakes, or anchors, each independently configured to be pushed through a wall, such as that using drywall material. In the example embodiment 10, the hanging system comprises a left-sided stake 12, a central stake 14, and a right-sided stake 16. Because of the unique configuration of these anchors, the inventive system may be employed using just a left-sided stake 12 and a central stake 14, or it could be employed using just a right-sided stake 16 and a central stake 14, or it could be employed using all three stakes together. Indeed, as one of ordinary skill in the art will appreciate from the description herein, multiple central stakes 14 may be employed in combination with a left-sided stake 12, a right-sided stake 16 or both.

With regard to one configuration of an embodiment of the invention, and with reference to FIG. 1 specifically, left-sided stake 12 may be comprise a generally elongate anchor portion 20a having a hook portion 20b at a proximal end of the anchor and a piercing portion 20c at a distal end of the anchor. Similarly, central stake 14 may comprise a generally elongate anchor portion 22a having a hook portion 22b at a proximal end of the anchor and a piercing portion 22c at a distal end of the anchor. And right-sided stake 16 may likewise comprises a generally elongate anchor portion 24a having a hook portion 24b at a proximal end of the anchor and a piercing portion 24c at a distal end of the stake.

Referring to FIGS. 1 and 2 together, more specifics about one example of an embodiment of a left-sided anchor and a right-sided anchor may be appreciated. In that regard, in one embodiment, left-sided stake 12 may comprises a first proximal portion 30 of the anchor portion 20a comprising a width about the same if not identical as the width of hook portion 20b. The anchor portion 20a further comprises a projection 32 having a width greater than the proximal portion 30 and a distal portion 34, which has a width about the same if not identical to the proximal portion 30 and the hook portion 20b. The projection 32 may comprise one of many different configurations to achieve the function of creating an opening in the wall wider than the hook portion 20b, proximal portion 30 and distal portion 34.

In the example embodiment shown FIG. 2, the projection 32 of the left-sided stake 12 comprises a multiple stepped profile that permits a gradual widening of the opening in the wall as the piercing portion 20c is first directed into the wall, followed by the distal portion 34 and then projection 32. In that regard, projection 32 comprises a first portion 32a, a second portion 32b and two transition portions 32c and 32d. Of course, other configurations are contemplated, in which the projection comprises only one stepped portion, or comprises more than two stepped portions. It is preferred, however, that the width of projection 32 be the same as the width of central stake 14, for reasons that will be appreciated further below.

The central stake 14 is completely different in that it has essentially a uniform width from one end to the other. In one embodiment, the anchor portion 22a of central stake 14 comprises a single anchor extension 36 between the hook 22b and the piercing portion 22c.

Similar to the left-sided stake 12, the right-sided stake 16 is configured to create an opening in the wall wider than the book portion 24b. In that regard, in one embodiment, right-sided stake 16 may comprises a first proximal portion 40 of the anchor portion 24a comprising a width about the same if not identical as the width of hook portion 24b. The anchor portion 24a further comprises a projection 42 having a width greater than the proximal portion 40 and a distal portion 44, which has a width about the same if not identical to the proximal portion 40 and the hook portion 24b. The projection 42 may comprise one of many different configurations to achieve the function of creating an opening in the wall wider than the hook portion 24b, proximal portion 40 and distal portion 44.

In the example embodiment shown FIG. 2, the projection 42 of the right-sided stake 16 comprises a multiple stepped profile that permits a gradual widening of the opening in the wall as the piercing portion 24c is first directed into the wall, followed by the distal portion 44 and then projection 42. In that regard, projection 42 comprises a first portion 42a, a second portion 42b and two transition portions 42c and 42d. As with the left-sided stake 12, the projection 43 of the right-sided stake 16 preferably comprises the same width as the central stake 14.

Figure 3:
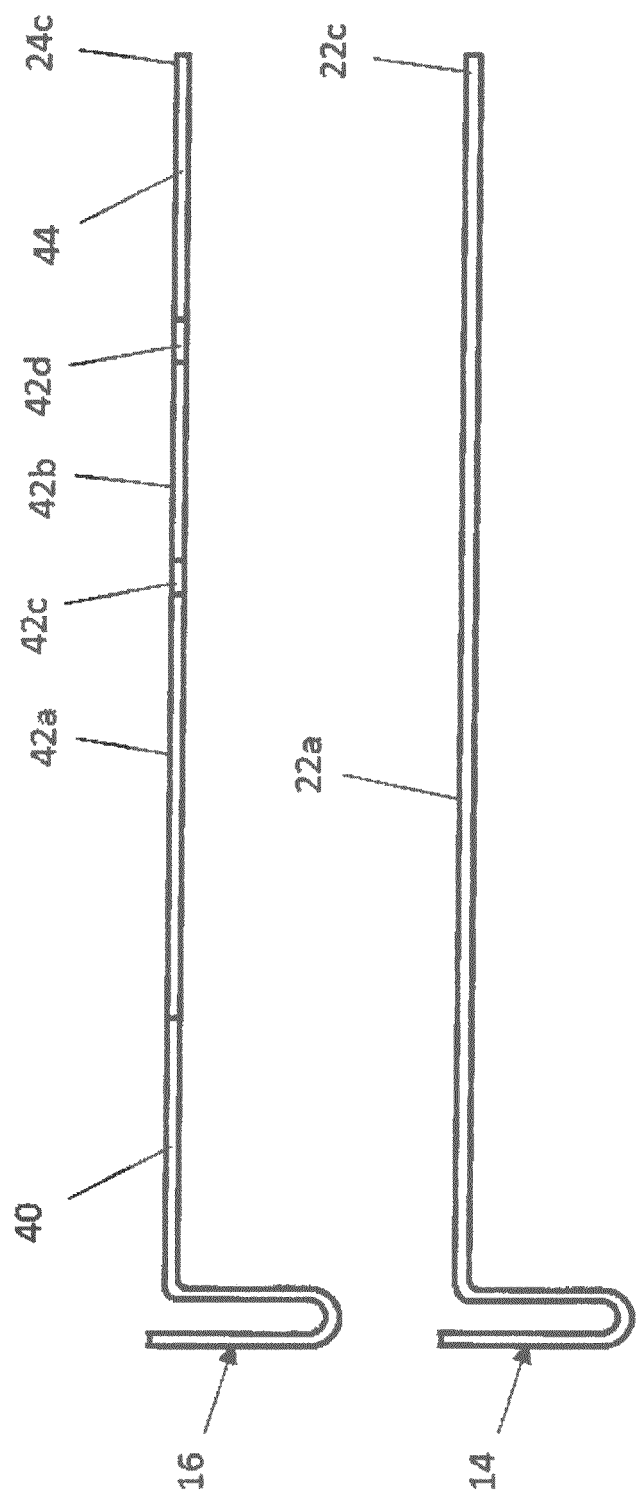
FIG. 3 is an elevational schematic view of the right-sided and central anchors of the embodiment of FIG. 1.

In one embodiment of the present invention, system 10 comprises a set of stakes that each have the same thickness. For example, with reference to FIG. 3, the central stake 14 has a thickness that is the same as the left-sided stake 12 (not shown) and the right-sided stake 16 (shown).

Figure 4A:
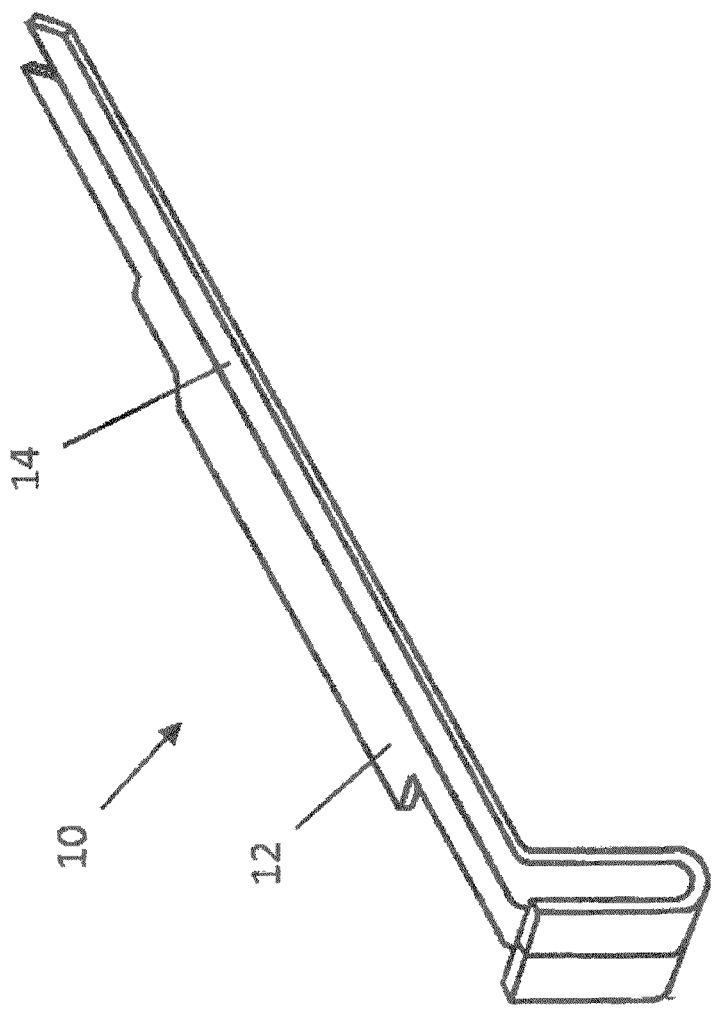
FIG. 4A is a perspective schematic view of one arrangement of the embodiment of FIG. 1 in Which only a left-sided and central anchor are used to hang an item.
Figure 4B:
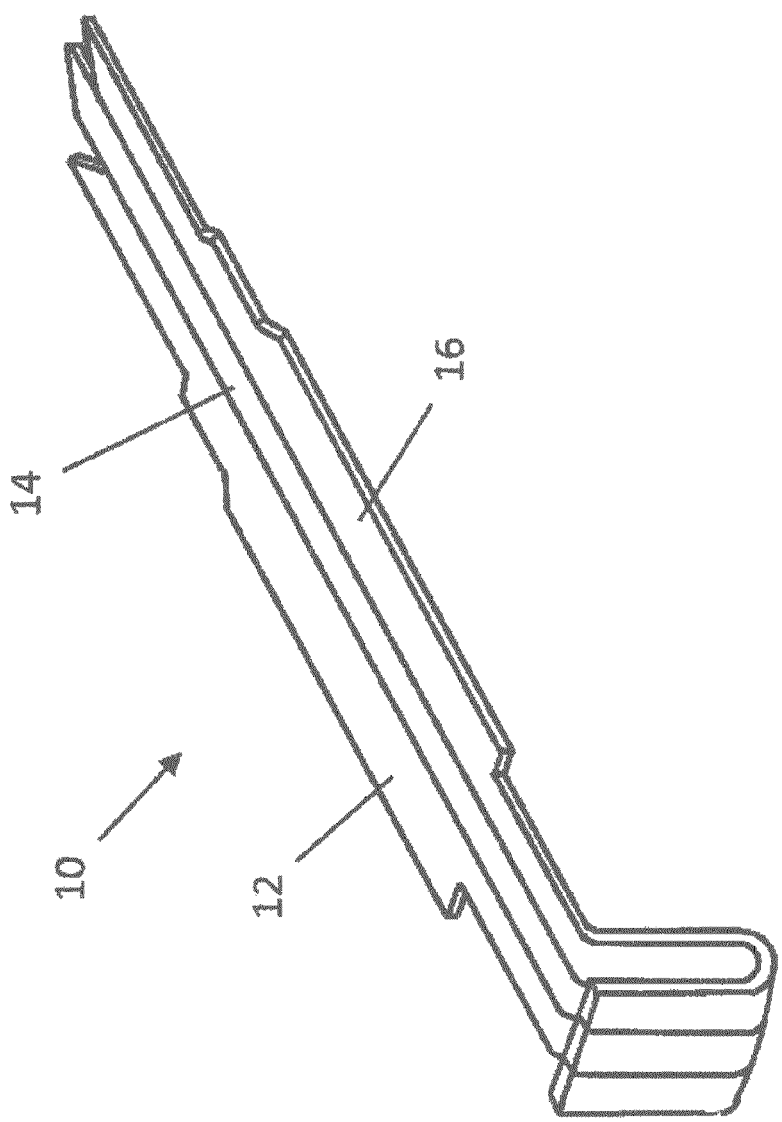
FIG. 4B is a perspective schematic view of one arrangement of the embodiment of FIG. 1 in which a left-sided anchor, a central anchor and a right-sided anchor are used to hang an item of greater weight than the arrangement of FIG. 4.

As may be appreciated, one of the advantages of embodiments of the present invention is their versatility. As explained above, the system 10 may be arranged for hanging an item on a wall in which the arrangement comprises only a left-sided stake 12 and a central stake 14, such as that shown in FIG. 4A. However, all three stakes or anchors described so far may be used together, as shown in FIG. 4B. The difference is that the added stake of the arrangement of FIG. 4B permits support of a heavier item to be hung on the wall. But as may be further appreciated, if heavier items are to be hung, additional central stakes may be employed to create an arrangement in which as left- and right-sided stake are used in conjunction with two or more central stakes.

Referring to FIGS. 5A through 5F, installation of one arrangement of an embodiment of the present invention may be described. In that regard, merely by example, a left-sided stake 12 is directed into wall "W" using the piercing portion 20c to pierce the wall and create an initial opening of the width of distal portion 34. Then, with further pushing force against the stake 12 toward wall W, the left projection portion 32 penetrates the wall to create a wider opening. When the stake 12 is pushed entirely through such that the hook portion 20b is up against the wall W, the proximal portion 30 resides within wall opening 52, where the wall opening 52 is equal to the entire width of the left-sided stake 12 at its widest portion of projection portion 32.

At this point, an important feature of embodiments of the invention may be appreciated. The junction between the projection portion 32 and the proximal portion 30 (and hook 20b) creates a shoulder 32f that can be used to lock the stake in place. In that regard, when stake 12 is pushed sufficiently through that the hook 20b is up against the wall, and shoulder 32f has cleared the opening 52, the anchor may then be slid to the left of the opening to permit entry of the central stake 14, as shown specifically in FIG. 5E. Because projection portion 32 at its full width is equal to the combined widths of the proximal portion 30 of left-sided stake 12 and extension portion 36 of central stake 14, the opening 52 that is created permit easy entry of central stake 14 into opening 52 adjacent left-sided stake 12 until the hook 22b is up against the wall next to the hook 20b. Referring to FIG. 6, the resulting joint hook arrangement is shown projecting through opening 52 in wall W. The anchor portions extend behind the wall locked into position in a stable and sturdy arrangement.

Figure 8:
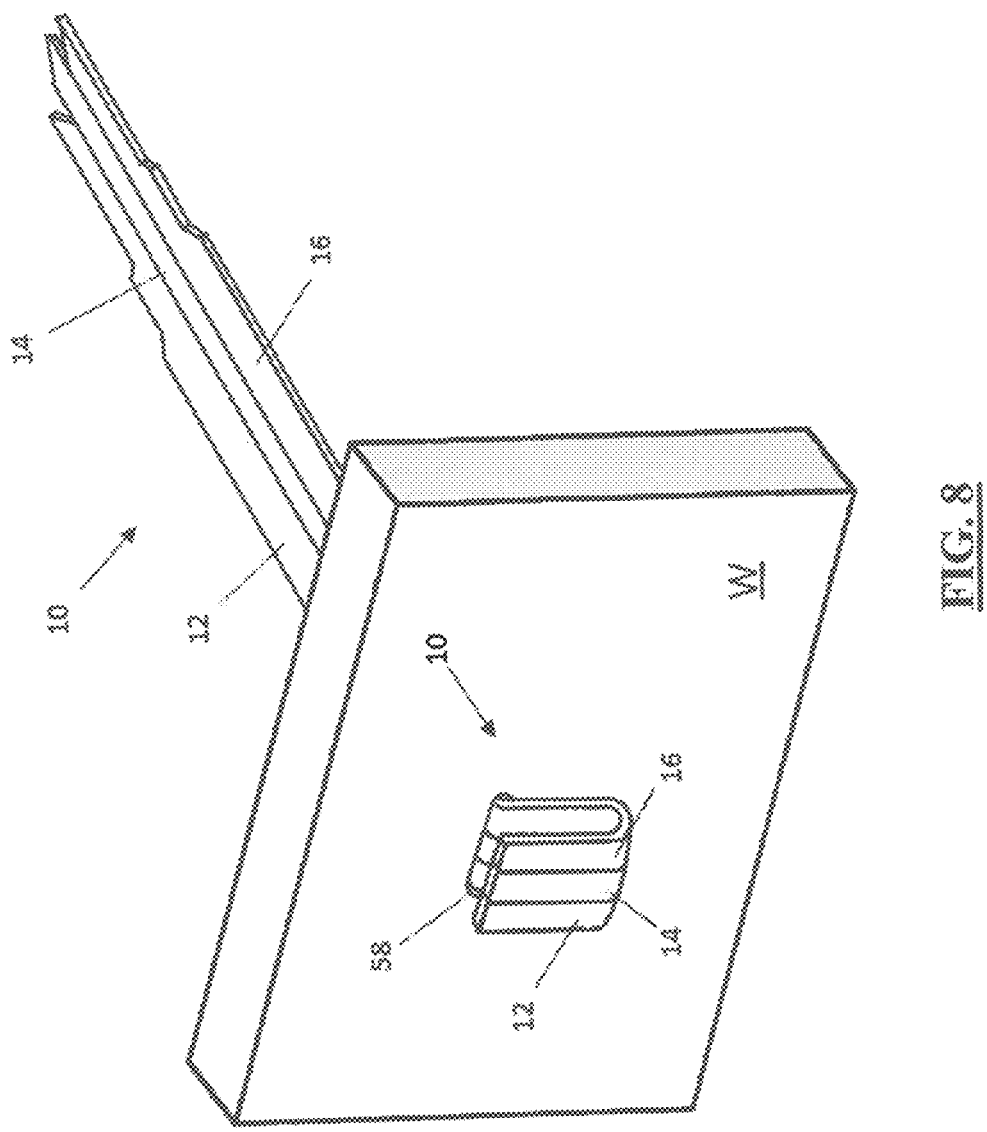
FIG. 8 shows a perspective schematic view of the result of the installation reflected in FIGS. 7A through 7E
Figure 9:
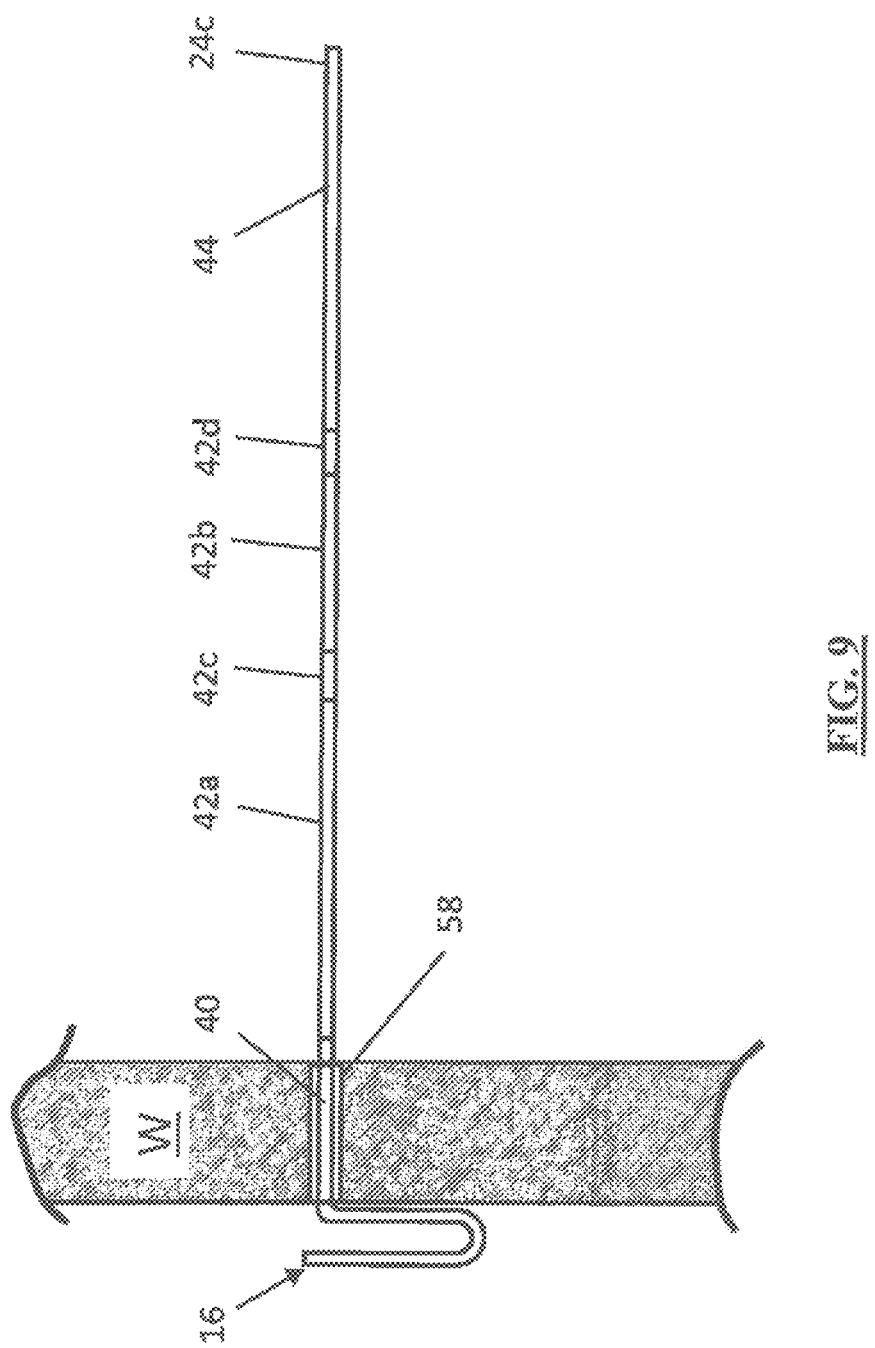
FIG. 9 shows an elevational schematic view of the installation reflected in FIG. 8.

Referring to FIGS. 7A through 7E, application of the embodiment of FIG. 4B into the wall "W" may be appreciated. In this regard, greater weight is to be sustained by the system, to a left-sided stake 12 is first pushed through the wall W and moved into locked position within resulting opening 56. Then right-sided stake 16 is then pushed through the wall, where right projection portion 42 then functions to create a wider opening 58, as shown in FIG. 7B specifically. The resulting opening 58 is created such that it will now permit rightward movement of the right-sided stake 16 to create room (see FIG. 7C) for the entry of central stake 14 into the opening 58, as shown in FIG. 7D. All three anchors are then pushed adjacent to each other so that their respective hooks are pushed up against wall "W" into alignment, as shown in FIG. 7E. Referring to FIG. 8, the result is a stronger item support because of the combination of three hooks instead of two, as shown in FIG. 6 FIG. 9 shows the result in elevational view, looking from the right side, where only the right-sided stake 16 is visible, with the other two stakes directly behind it.

Because the design is simple, it is easy to manufacture and easy to carry out the inventive methods. Persons of ordinary skill in the art may appreciate that numerous design configurations may be possible to permit performance of at least a portion of the inventive methods. Thus, the scope of the invention is reflected by the breadth of the claims below rather than narrowed by the embodiments described above.

What is claimed is:

1. A system for mounting an item to a wall, the system comprising a plurality of stakes, each comprising one of a plurality of configurations and widths to permit flexibility by a user to vary the number and configuration of stakes to accommodate the weight and size of such item, each stake having a proximal end and a distal end and an extension member there between, each stake comprising a hook at the proximal end and a piercing element at the distal end, at least one stake comprising an extension member having a uniform width, and at least one stake comprising an extension member having a plurality of widths, at least one width being greater than the width of the hook, the piercing element of each stake configured to permit the stake to be driven into the wall upon the application of force upon the proximal end of the stake so as to create a hole in the wall and permitting a substantial portion of the stake to penetrate the wall while leaving the hook of the proximal end exposed to the user.

2. The system of claim 1, wherein each hook is uniform in configuration such that when a plurality of stakes are positioned adjacent each other within the wall, the plurality of hooks functions as a single hanger upon which the item to be hung may be suspended on the wall.

3. The system of claim 1, wherein the at least one stake comprising an extension member having a plurality of widths is configured asymmetrically toward a first direction normal to the extension member of the stake.

4. The system of claim 3, wherein at least a second stake comprising an extension member having a plurality of widths is configured asymmetrically toward a second direction normal to the extension member of the stake.

5. The system of claim 4, wherein the system comprises at least three stakes configured to be positioned adjacent to each other in a single horizontal plane when driven into the wall, the first stake comprising the stake configured with the asymmetry in the first direction, the second stake comprising the stake with a uniform width extension member, and the third stake comprising the stake configured with the asymmetry in the second direction, such that three hooks are exposed to the user so as to form a single hanger upon which the item may be hung.

* * * * *